United States Patent
Yellapragada et al.

(10) Patent No.: US 9,217,331 B1
(45) Date of Patent: Dec. 22, 2015

(54) IMPELLER BALANCING USING ADDITIVE PROCESS

(71) Applicant: BorgWarner Inc., Auburn Hills, MI (US)

(72) Inventors: Srikar Yellapragada, Fletcher, NC (US); Rob Wallace, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/633,943

(22) Filed: Feb. 27, 2015

(51) Int. Cl.
*F01D 5/02* (2006.01)
*F01D 5/04* (2006.01)
*F04D 29/22* (2006.01)

(52) U.S. Cl.
CPC .............. *F01D 5/027* (2013.01); *F01D 5/043* (2013.01); *F04D 29/2261* (2013.01); *F05D 2220/40* (2013.01)

(58) Field of Classification Search
CPC ........ F01D 5/027; F16F 15/32; F16F 15/322; G01M 1/32
See application file for complete search history.

(56) References Cited

U.S. PATENT DOCUMENTS

| | | | | |
|---|---|---|---|---|
| 5,163,816 | A * | 11/1992 | Goetzke et al. | 416/204 A |
| 2010/0178132 | A1* | 7/2010 | Ante et al. | 411/427 |
| 2012/0183406 | A1* | 7/2012 | Yoshida et al. | 416/219 R |

FOREIGN PATENT DOCUMENTS

JP          2010107293 A  *  5/2010

OTHER PUBLICATIONS

J-Plat Pat, Machine Translation of JP2010107293A, May 12, 2015, JPO.*
www.trumpf.com ; Title: Building shapes out of powder and wire ; copyright 2015 Trumpf ; 1 page.
Stephan Ziermann ; Title: Latest Trends in Laser Welding of Powertrain Components ; Trumpf Inc ; Plymouth MI 48170 ; Sep. 19, 2013 ; 26 pages.

* cited by examiner

*Primary Examiner* — Craig Kim
*Assistant Examiner* — Adam W Brown
(74) *Attorney, Agent, or Firm* — BrooksGroup

(57) ABSTRACT

A number of variations may include a method of balancing a rotor assembly and a balanced rotor assembly which may involve additive material applied to the rotor assembly. One or more of the following options may be employed: adding a mass to an impeller hub between two adjacent vanes; adding a mass to an impeller back wall; adding a mass to back wall scallops, and adding a mass to an impeller nose. Material removal may be used in combination with material addition.

7 Claims, 3 Drawing Sheets

US 9,217,331 B1

IMPELLER BALANCING USING ADDITIVE PROCESS

TECHNICAL FIELD

The field to which the disclosure generally relates includes turbochargers for use with internal combustion engines and in particular, includes turbocharger component and assembly balancing.

BACKGROUND

A turbocharger for use with an internal combustion engine may typically include a compressor that may be driven by a turbine or other rotation imparting device. The turbine may have a wheel connected to a compressor wheel by a common shaft that is supported for rotation by bearings. The bearings may be disposed in a housing that may be situated between the turbine and the compressor, which may form a core assembly.

A turbocharger's rotor assembly may rotate at speeds that approach hundreds of thousands of revolutions per minute. In addition, the turbine may be exposed to high temperature exhaust gases and the resulting heat may be transferred to other system components. Under these harsh, and increasingly demanding operating conditions, the lifespan of a turbocharger is expected to match that of the engine with which it operates. To accomplish that challenge, the design of a turbocharger and its components must be robust to survive as expected, while still being cost effective and competitive. As a result, a turbocharger is designed to exacting tolerances and standards, and in view of the involved rotational speeds, a turbocharger assembly must be precisely balanced.

SUMMARY OF ILLUSTRATIVE VARIATIONS

According to a number of variations, a method of balancing a rotor assembly and a balanced rotor assembly may include additive material applied to the rotor assembly. One or more of the following options may be employed: adding a mass to an impeller hub between two adjacent vanes; adding a mass to an impeller back wall; adding a mass to back wall scallops, and adding a mass to an impeller nose. Material removal may be used in combination with material addition.

Other illustrative variations within the scope of the invention will become apparent from the detailed description provided herein. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawing, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
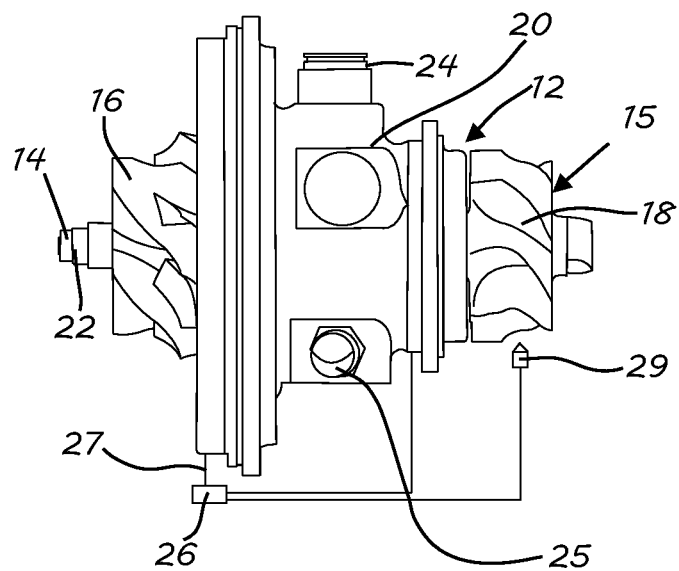
FIG. 1 is a perspective illustration of a core assembly of a turbocharger mounted in the fixture of a balancing machine, shown schematically, according to a number of variations.

Referring to FIG. 1, a turbocharger core assembly 12 according to a number of variations is illustrated. The core assembly 12 may include a rotor assembly 15 comprising a shaft 14 connecting an impeller in the form of a compressor wheel 16 and an impeller in the form of a turbine wheel 18. The rotor assembly 15 including the turbine wheel 18, the shaft 14, and the compressor wheel 16, must be precisely balanced to perform at extremely high operational rotation speeds. The core assembly 12 may include a central housing 20 that supports the rotor assembly. The turbine wheel 18 may be connected with the shaft 14 prior to insertion of the shaft 14 into the central housing 20. The compressor wheel 16 may be fixed to the shaft 14 after insertion and may be secured by a nut 22. The core assembly 12 is a subassembly of the turbocharger system that does not include the turbine and compressor covers. The housing 20 may support the shaft 14 through a lubricated bearing system and may include a lubricant flow inlet 24 and a lubricant flow outlet 25.

The core assembly 12 may be mounted in a fixture 27 of a balancing machine 26 and the rotor assembly 15 may be spun by a rotation imparting device 29 to determine the state of imbalance. The compressor wheel 16 and the turbine wheel 18 (with or without the shaft 14), may separately be mounted in a balancing machine and spun to determine their individual state of imbalance. The balancing machines may be programmed to calculate mass and location angle determinants for correction of the component's balance. The components may be modified with material, equivalent to the determined mass at the determined angle, being added or removed to achieve balance.

Figure 2:
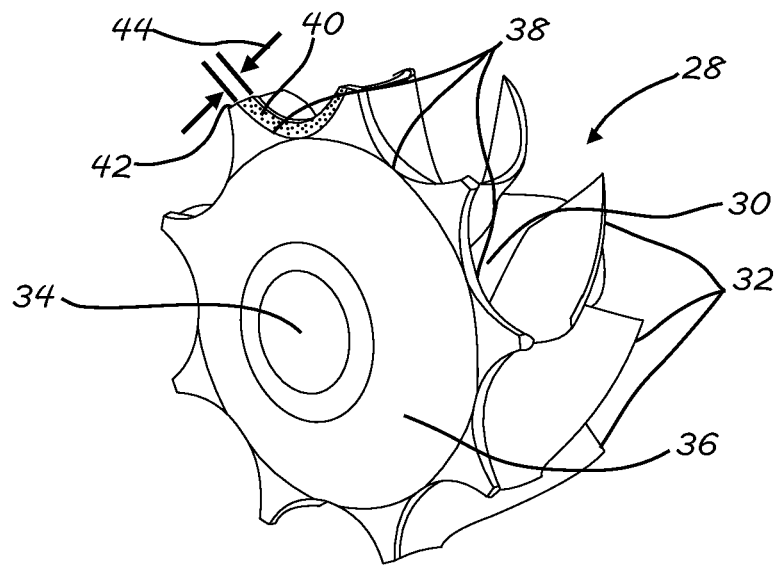
FIG. 2 is a perspective illustration of an impeller balanced according to a number of variations.

A number of variations may include an impeller in the form of a turbine wheel 28 illustrated in FIG. 2, which may be used as the turbine wheel 18 of FIG. 1. The turbine wheel 28 may include a hub 30 with a number of vanes 32 extending from the hub 30, which may be designed for desired aerodynamic operation. The turbine wheel 28 may include an opening 34 for connection to the shaft 14, or may be formed integral with the shaft 14. The turbine wheel 28 may include a back wall 36 that extends radially around the back of the hub and which may have an outer periphery with a series of scallops 38 formed in the back wall 36 between each pair of vanes in the number of vanes 32. An imbalance of the turbine wheel 28 may be corrected by applying additive material 40 in a scallop or a number of scallops within the series of scallops 38. The material 40 may be added between the high points 42 that correspond to the vanes 32 so that the overall outer diameter of the turbine wheel 28 is not increased. The material may be an austenitic nickel chromium based alloy or another high density material. The thickness and the length of the bead may be sufficient to achieve the amount of mass necessary to achieve balance. The thickness 44, generally in the radial direction may be up to 1 millimeter. The additive material may be deposited through a controlled process which may involve laser cladding, laser sintering, welding, or another material deposition process.

Figure 3:
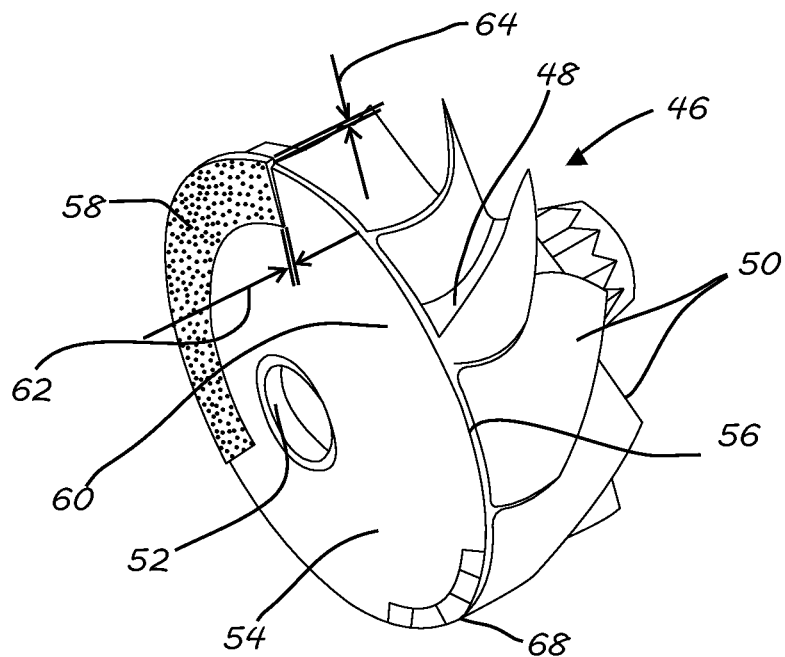
FIG. 3 is a perspective illustration of an impeller balanced according to a number of variations.

A number of other variations may include an impeller in the form of a turbine wheel 46 illustrated in FIG. 3, which may be used as the turbine wheel 18 of FIG. 1. The turbine wheel 46 may include a hub 48 with a number of vanes 50 extending from the hub 48, which may be designed for desired aerodynamic operation. The turbine wheel 46 may include an opening 52 for connection to the shaft 14, or may be formed integral with the shaft 14. The turbine wheel 46 may include a back wall 54 that extends radially around the back of the hub 48 and which may have an outer periphery 56. Any imbalance of the turbine wheel 46 may be corrected by applying additive material 58 to the back wall 54. The material 58 may be added to the back face 60 of the back wall 54 adjacent the outer periphery 56 and may be added to the outer periphery 56 itself. The thickness 62 of the additive material 58 may be up to 0.5 millimeter of buildup on the back face 60 in the axial direction shown between the arrows. The thickness 64 of the additive material 58 may be up to 1.0 millimeter of buildup on the outer periphery 56 in the radial direction as shown between the arrows. The material may be similar to that described in relation to FIG. 2 or may be another appropriately dense material suitable for application to the turbine wheel 46. The thickness and the length of the bead may be sufficient to achieve the amount of mass necessary to achieve balance. The additive material may be deposited through a controlled process which may involve laser cladding, laser sintering, welding, or another material deposition process. In addition, a cut or series of cuts 68 may be made in the back face 60 on the heavy side of the impeller, where necessary. The cuts may be formed by grinding, milling, or another material removal process. A combination of the additive material 58 and the cuts 68 may achieve balance in an additional percentage of impellers than might otherwise be possible through one method alone.

Figure 4:
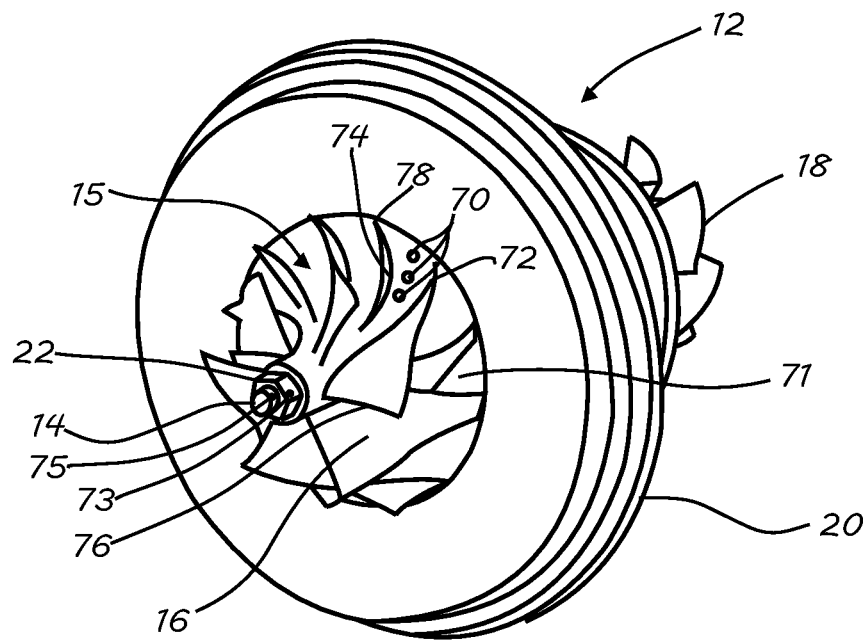
FIG. 4 is a perspective illustration of a core assembly of a turbocharger balanced according to a number of variations.

Additional variations may include the core assembly 12 from FIG. 1 illustrated from another perspective in FIG. 4. The rotor assembly 15 including the compressor wheel 16, the shaft 14, and the turbine wheel 18, may be assembled with the central housing 20. In the assembled form, the core assembly 12 may be loaded on a balancing machine and the mass necessary to balance the rotor assembly 15 may be determined, as described in relation to FIG. 1. Once the amount of mass and its angular location is determined, the needed balancing mass may be applied as balancing material on the hub 71 of the compressor wheel 16 between blade sections of the assembled core 12, in the gas path. For example, the balancing material may be applied between blades 72 and 74 as a series of beads 70. Each of the beads 70 may have a diameter of 2.0 millimeters and a height of 0.5 millimeters. The number of individual beads 70 in the series is determined by the amount of mass needed to correct balance. The impeller in this case the compressor wheel 16 may have an inducer side 76 for inflow and an exducer side 78 for outflow. The beads 70 may be preferably located closer to the exducer side 78 than the inducer side 76. The beads 70 may be spread out and aligned in a profiled series that follows a stream wise direction defined by the contour of the blades 72, 74 profile, so that the bead 70 series may cause turbulence to the flow and thus increase energy to move flow separation further downstream. The beads 70 may be applied to one or both of the compressor wheel 16 and the turbine wheel 18. In addition, material may be added to the shaft 14 and the nut 22 in a variety of shapes to apply the mass needed for balance. For example, a bead 73 may be added to the nut 22. Also as an example, a bead 75 may be added to the shaft 14.

Figure 5:
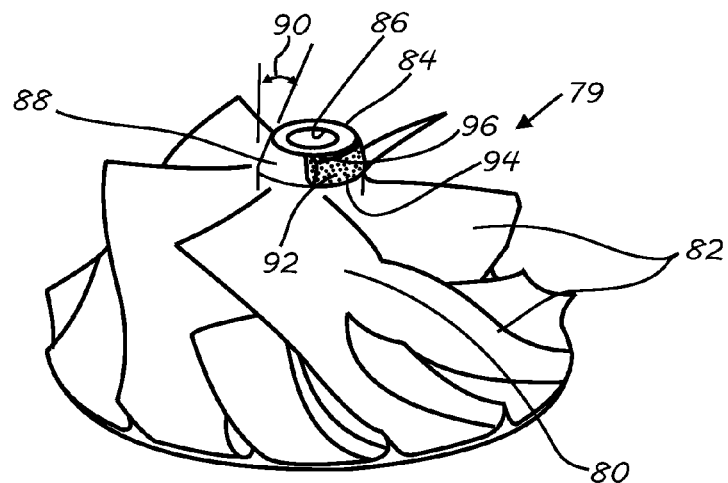
FIG. 5 is a perspective illustration of an impeller balanced according to a number of variations.

A number of other variations are illustrated in relation to FIG. 5, for balancing an impeller, shown as compressor wheel 79. The compressor wheel 79 may have a hub 80 with a number of vanes 82 disposed around the hub 80. The hub may terminate at a nose section 84, that may include an opening 86 for receiving a shaft, such as shaft 14 of FIG. 1. The exterior perimeter surface 88 of the nose section 84 may exhibit a taper at an angle 90. The compressor wheel 79 may be loaded on a balancing machine and the mass and its angular location necessary to achieve balance may be determined, as described in relation to FIG. 1. Once the amount of mass and its angular location is determined, the needed balancing mass may be deposited as a bead of balancing material 92 on the surface 88 around a portion of the perimeter. The balancing material 92 may be applied thinner at the inboard edge 94 and thicker at the outboard edge 96 to offset the taper angle 90. Balance correction on the nose section 84 using the tapered surface 88 and additive material 92, may increase the yield of achievable correction above that reached through other methods by maintaining the features needed for minimum clamp load such as from the nut 22 of FIG. 1. In addition, adding material on the nose section 84 has minimal impact on inertia since the balancing material is added close to axis.

Figure 6:
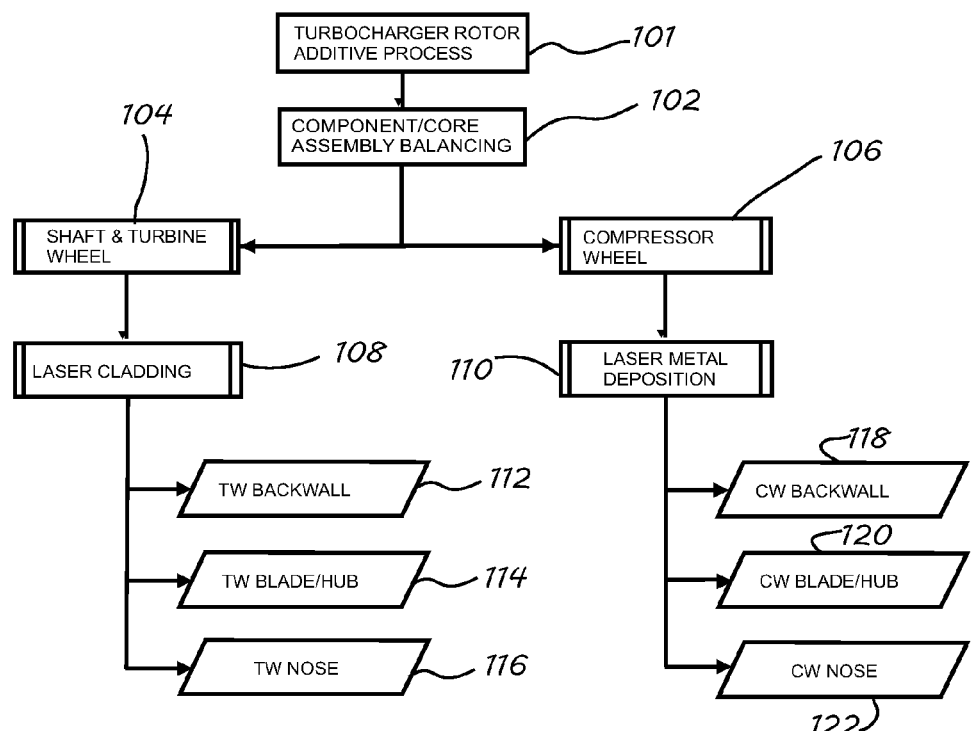
FIG. 6 is a diagrammatic illustration of a balancing method according to a number of variations.

A number of variations are illustrated diagrammatically in FIG. 6. A method of balancing a turbocharger rotor assembly such as the rotor assembly 15 of FIG. 1, may involve an additive process indicated at box 101. As indicated at box 102, the balancing method may involve one or both of individual component and core assembly 12 balancing. The shaft 14 and turbine wheel 18 may be balanced individually or together as an assembly as indicated at box 104 and optionally or also as a component in the core assembly 12. The compressor wheel 16 may be balanced as indicated at box 106 individually and optionally or also as a component in the core assembly 12.

The turbine wheel 18 may have a base material of an austenitic nickel chromium based alloy, a nickel cobalt based alloy, or another high-performance alloy. A high-performance alloy may be one that exhibits excellent mechanical strength, resistance to thermal creep deformation, good surface stability, and resistance to corrosion or oxidation. The turbine wheel 18 may be balanced by adding material by laser cladding as indicated at box 108. The material may be added at the turbine wheel's back wall as shown at box 112. Balancing material may be applied to scallops around the perimeter of the back wall, or to the perimeter tip or back face of the back wall all as described above in relation to FIGS. 2 and 3. As shown in box 114, balancing material may be added to the blade hub section between adjacent blades as described above in relation to FIG. 4. At box 116, balancing material may be applied to the nose of the impeller as described above in relation to FIG. 5. Any combination of the options outlined in boxes 112, 114 and 116, along with material removal by applying cuts may be used to balance the rotor assembly 15 at the turbine wheel 18.

The compressor wheel 16 may have a base material of an aluminum alloy, a titanium alloy, or another suitable alloy. The compressor wheel 16 may be balanced by adding material by laser metal deposition as indicated at box 110. Balancing material may be added at its back wall as shown at box 118. The balancing material may be applied to scallops around the perimeter of the back wall, or to the perimeter tip or back face of the back wall all as described above in relation to FIGS. 2 and 3. As shown in box 120, balancing material may be added to the blade hub section between adjacent blades as described above in relation to FIG. 4. At box 122, balancing material may be applied to the nose of the impeller as described above in relation to FIG. 5. Any combination of the options outlined in boxes 118, 120 and 122, along with material removal by applying cuts may be used to balance the rotor assembly 15 at the compressor wheel 16.

The additive balancing techniques described herein may have a number of benefits. Scrap rate on shaft and wheels may be reduced by bringing the turbine wheel castings into balance specifications since the ability to add material has a high degree of flexibility. The additive process may achieve balance correction in reduced steps. Balancing through additive processes may allow reducing impeller back wall thickness of 0.2 millimeter to 0.5 millimeter, which may beneficially decrease rotor inertia. Material deposition has a positive impact on stress level resistance, supporting greater rotational speeds. In addition, turbine and compressor wheel nose length may be reduced. In relation to the benefit of reduced back wall thickness, it has been determined that, in the case of reducing thickness from 1.2 millimeter to 0.8 millimeter, and factoring in added material for balancing, an overall reduction in inertia of six percent may be achieved in an impeller. In addition, the impeller's stress profile may be maintained to a similar degree or reduced.

Through the foregoing structure and steps, a method of balancing turbocharger components and assemblies is provided that enables the use of lighter gauge materials for the rotor wheels and may result in improved overall balancing results. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered within the scope of the invention.

Variation 1 may involve a method of balancing a rotor assembly. The rotor assembly may include a compressor wheel that is rotatably driven. The compressor wheel may be formed to have a hub supporting a plurality of vanes disposed around the hub. A back wall may extend from the hub. The back wall may have an outer peripheral surface. A nose may extend from the hub. A correction mass may be determined to add to the rotor assembly to balance the rotor assembly. The correction mass may be added to the compressor wheel.

Variation 2 may include the method according to variation 1 wherein the correction mass may be formed to a thickness no more than 1.0 millimeter.

Variation 3 may include the method according to variation 1 or 2 wherein the correction mass may be formed as a series of beads on the hub.

Variation 4 may include the method according to variation 3 wherein the plurality of vanes has a profile. The series of beads may be formed in a row that matches the profile.

Variation 5 may include the method according to variation 1 or 2 wherein the correction mass may be added to the compressor wheel. The back wall may be cut to remove material from the compressor wheel opposite the correction mass.

Variation 6 may include the method according to any of variations 1 through 5 and may include forming a turbine wheel as part of the rotor assembly and adding the correction mass to the turbine wheel. The turbine wheel may be cut to remove material from the turbine wheel opposite the correction mass.

Variation 7 may include the method according to variation 1 wherein scallops may be formed in the outer peripheral surface. The correction mass may be added in one or more of the scallops.

Variation 8 may include the method according to variation 1 wherein the correction mass may be added to the nose.

Variation 9 may include the method according to variation 1 wherein the nose may have a terminal end. The nose may be formed with a taper forming an angled surface tapering to the terminal end. The correction mass may be added to the nose around part of the angled surface to fill the taper to the terminal end.

Variation 10 may involve a method of balancing a rotor assembly. The rotor assembly may include a compressor wheel connected to a turbine wheel by a shaft. The compressor wheel may be formed to have a first hub supporting a first plurality of vanes disposed around the first hub and a first back wall extending from the first hub. The first back wall may have a first outer peripheral surface. A first nose may extend from the first hub. The turbine wheel may be formed to have a second hub supporting a second plurality of vanes disposed around the second hub and a second back wall extending from the second hub wherein the second back wall may have a second outer peripheral surface. A second nose may extend from the second hub. A correction mass may be determined to add to one or both of the compressor wheel and the turbine wheel to balance the rotor assembly. One or more of the following options may be selected: a. adding the correction mass to the first hub between two of the first plurality of vanes; b. adding the correction mass to the second hub between two of the second plurality of vanes; c. adding the correction mass to the first back wall including on the first outer peripheral surface; d. adding the correction mass to the second back wall including on the second outer peripheral surface; e. adding the correction mass to the first nose; and f. adding the correction mass to the second nose. The correction mass may be added according to the selected options.

Variation 11 may include the method according to variation 10 and may include forming the first nose with a first terminal end. A first taper may form a first angled surface tapering toward the first terminal end. The second nose may be formed with a second terminal end. A second taper may form a second angled surface tapering toward the second terminal end. The options e and f may alternatively include: e. adding the correction mass to the first nose around part of the first angled surface to fill the first taper to the first terminal end; and f. adding the correction mass to the second nose around part of the second angled surface to fill the second taper to the second terminal end.

Variation 12 may include the method according to variation 10 wherein the options a and b may alternatively include: a. adding the correction mass to the first hub by forming of a first series of beads placed between two of the first plurality of vanes; and b. adding the correction mass to the second hub by forming of a second series of beads between two of the second plurality of vanes.

Variation 13 may include the method according to variation 12 and may include forming the first series of beads by forming individual beads in the first and the second series of beads, each with a 2.0 millimeter diameter and a 0.5 millimeter height.

Variation 14 may include the method according to variation 10 wherein forming the turbine wheel further comprises forming a series of scallops in the second outer peripheral surface. The option may alternatively include: d. adding the correction mass to the second back wall including on the second outer peripheral surface within one or more scallops within the series of scallops.

Variation 15 may involve a product for use with an internal combustion engine. An impeller wheel may be connected to a shaft to form a rotor assembly. The impeller wheel may have a hub. A back wall may extend from the hub. The back wall may have an outer peripheral surface. A nose may extend from the hub opposite the back wall. A plurality of vanes may be disposed around the hub between the back wall and the nose. A balancing mass may be added to the rotor assembly. The balancing mass may be added to a surface of the rotor assembly and may extending no more than a select distance from the surface.

Variation 16 may include the product according to variation 15 wherein the impeller wheel may have a plurality of scallops formed in the outer peripheral surface. The balancing mass may be added in at least one of the plurality of scallops.

Variation 17 may include the product according to variation 15 wherein the back wall may have a back face facing away from the plurality of blades. The balancing mass may be added to the back face and the outer peripheral surface.

Variation 18 may include the product according to variation 15 wherein the impeller wheel is fixed on the shaft by a nut, and wherein the balancing mass is added to at least one of the shaft and the nut.

Variation 19 may include the product according to variation 15 wherein the balancing mass may include a line of discrete beads applied to the hub.

Variation 20 may include the product according to variation 15 wherein the nose may have a terminal end and may be formed with a taper forming an angled surface tapering to the terminal end. The balancing mass may be positioned on the nose around at least a part of the angled surface filling the taper to the terminal end.

The above description of select variations within the scope of the invention is merely illustrative in nature and, thus, variations or variants thereof are not to be regarded as a departure from the spirit and scope of the invention.

What is claimed is:

1. A method of balancing a rotor assembly wherein the rotor assembly includes a compressor wheel that is rotatably driven, the method comprising:
    forming the compressor wheel as part of the rotor assembly, the compressor wheel formed to have a hub supporting a plurality of vanes disposed around the hub and a back wall extending from the hub wherein the back wall has an outer peripheral surface, and a nose extending from the hub;
    determining a correction mass to add to the rotor assembly to balance the rotor assembly; and
    adding the correction mass to the compressor wheel through at least one of:
    (a) forming the correction mass as a series of beads on the hub, wherein the plurality of vanes has a profile and further comprising forming the series of beads in a row that matches the profile; or
    (b) forming scallops in the outer peripheral surface and wherein the step of adding the correction mass to the compressor wheel comprises adding the correction mass in one or more of the scallops.

2. The method according to claim 1 further comprising forming the correction mass to a thickness no more than 1.0 millimeter.

3. The method according to claim 1 wherein the correction mass is added to the compressor wheel and further comprising cutting the back wall to remove material from the compressor wheel opposite the correction mass.

4. A method of balancing a rotor assembly wherein the rotor assembly includes a compressor wheel that is rotatably driven, the method comprising:
    forming the compressor wheel as part of the rotor assembly, the compressor wheel formed to have a hub supporting a plurality of vanes disposed around the hub and a back wall extending from the hub wherein the back wall has an outer peripheral surface, and a nose extending from the hub;
    determining a correction mass to add to the rotor assembly to balance the rotor assembly; and
    adding the correction mass to the compressor wheel, wherein the nose has a terminal end and wherein the nose is formed with a taper forming an angled surface tapering to the terminal end and further comprising adding the correction mass to the nose around part of the angled surface to fill the taper to the terminal end.

5. A method of balancing a rotor assembly wherein the rotor assembly includes a compressor wheel connected to a turbine wheel by a shaft, the method comprising:
    forming the compressor wheel to have a first hub supporting a first plurality of vanes disposed around the first hub and a first back wall extending from the first hub wherein the first back wall has a first outer peripheral surface, and a first nose extending from the first hub;
    forming the turbine wheel to have a second hub supporting a second plurality of vanes disposed around the second hub and a second back wall extending from the second hub wherein the second back wall has a second outer peripheral surface, and a second nose extending from the second hub;
    determining a correction mass to add to one or both of the compressor wheel and the turbine wheel to balance the rotor assembly; and
    selecting one or more of options: (a) adding the correction mass to the first hub between two of the first plurality of vanes; and (b) adding the correction mass to the second hub between two of the second plurality of vanes; and
    adding the correction mass according to the selected options,
    wherein the options: (a) adding the correction mass to the first hub between two of the first plurality of vanes; and (b) adding the correction mass to the second hub between two of the second plurality of vanes; comprises: (a) adding the correction mass to the first hub by forming of a first series of beads placed between two of the first plurality of vanes; or (b) adding the correction mass to the second hub by forming of a second series of beads between two of the second plurality of vanes.

6. The method according to claim 5 further comprising forming the first series of beads by forming individual beads in the first and the second series of beads, each with a 2.0 millimeter diameter and a 0.5 millimeter height.

7. A product for use with an internal combustion engine comprising:
    an impeller wheel connected to a shaft to form a rotor assembly;
    the impeller wheel has a hub and a back wall extends from the hub wherein the back wall has an outer peripheral surface facing away from the shaft, and a nose extends from the hub opposite the back wall wherein a plurality of vanes is disposed around the hub between the back wall and the nose; and
    a balancing mass added to the rotor assembly, the balancing mass added to a surface of the rotor assembly and extending no more than a select amount from the surface, wherein the back wall has a back face facing away from the plurality of blades, and wherein the balancing mass is added to the back face and the outer peripheral surface.

* * * * *